US012592580B2

(12) United States Patent
Zhu et al.

(10) Patent No.: US 12,592,580 B2
(45) Date of Patent: Mar. 31, 2026

(54) POWER MODULE AND POWER DISTRIBUTION SYSTEM

(71) Applicant: Vertiv Tech Co., Ltd., Shenzhen (CN)

(72) Inventors: Zhonglin Zhu, Shenzhen (CN); Yong He, Shenzhen (CN); Shiyang Tu, Shenzhen (CN); Yan Gao, Shenzhen (CN)

(73) Assignee: Vertiv Tech Co., Ltd., Shenzhen (CN)

( * ) Notice: Subject to any disclaimer, the term of this patent is extended or adjusted under 35 U.S.C. 154(b) by 19 days.

(21) Appl. No.: 18/540,762

(22) Filed: Dec. 14, 2023

(65) Prior Publication Data

US 2024/0380238 A1     Nov. 14, 2024

(30) Foreign Application Priority Data

May 10, 2023     (CN) .......................... 202321115763.1

(51) Int. Cl.
*H02J 9/06* (2006.01)
*H02B 1/20* (2006.01)

(52) U.S. Cl.
CPC ................ *H02J 9/062* (2013.01); *H02B 1/20* (2013.01)

(58) Field of Classification Search
CPC .................................. H02J 9/062; H02B 1/20
USPC .......................................................... 307/66
See application file for complete search history.

(56) References Cited

U.S. PATENT DOCUMENTS

2021/0021152 A1* 1/2021 Kurozaki ................ H02J 9/062
2021/0391745 A1* 12/2021 Ohno ........................ H02J 9/062
2024/0356367 A1* 10/2024 Kinuta ...................... H02J 9/06

FOREIGN PATENT DOCUMENTS

JP             7168108 B1     11/2022

OTHER PUBLICATIONS

United Kingdom Search and Examination Report regarding Application No. GB2318836.0, dated Jun. 6, 2024.

* cited by examiner

*Primary Examiner* — Michael R. Fin
(74) *Attorney, Agent, or Firm* — Harness, Dickey & Pierce, P.L.C.

(57) ABSTRACT

Provided are a power module and a power distribution system. The power module includes an input busbar, an output busbar, an internal protection unit and a UPS. The input busbar is electrically connected to an AC input terminal of the UPS through the internal protection unit. The output busbar is electrically connected to an AC output terminal of the UPS through the internal protection unit. The battery input terminal is electrically connected to a DC input terminal of the UPS through the internal protection unit, or is electrically connected to the DC input terminal of the UPS and an external protection unit disposed outside the power module. The input busbar and the output busbar are disposed outside the UPS without passing through the inside of the UPS. The AC input terminal, the AC output terminal and the DC input terminal are all electrically connected to the protection unit.

7 Claims, 8 Drawing Sheets

POWER MODULE AND POWER DISTRIBUTION SYSTEM

CROSS-REFERENCE TO RELATED APPLICATION

This application claims priority to Chinese Patent Application No. 202321115763.1 filed on May 10, 2023 and entitled "POWER MODULE AND POWER DISTRIBUTION SYSTEM", the disclosure of which is incorporated herein by reference in its entirety.

FIELD

The present disclosure relates to the technical field of power supply, and in particular to a power module and a power distribution system.

BACKGROUND

As an important part of a power distribution system, a power module provides power for devices. In the power module, an uninterruptible power supply (UPS) serves as a main unit for power supply and may continuously supply power to the devices.

In the conventional technology, the UPS in the power module cannot be removed while the power module is live.

SUMMARY

The present disclosure provides a power module and a power distribution system to solve the problem in the conventional technology that the UPS in the power module cannot be removed while the power module is live.

In the first aspect, a power module is provided in an embodiment of the present disclosure. The power module includes an input busbar, an output busbar, an internal protection unit, an uninterruptible power supply and a battery input terminal. The input busbar is electrically connected to an AC input terminal of the uninterruptible power supply through the internal protection unit, and the output busbar is electrically connected to an AC output terminal of the uninterruptible power supply through the internal protection unit. The battery input terminal is electrically connected to a DC input terminal of the uninterruptible power supply through the internal protection unit, or the battery input terminal is electrically connected to the DC input terminal and an external protection unit disposed outside the power module. The uninterruptible power supply is disposed independently from the input busbar and the output busbar.

In a possible embodiment, the power module further includes a cabinet, and a first accommodation space and a second accommodation space are provided within the cabinet. The input busbar, the output busbar and the internal protection unit are disposed within the first accommodation space, and the uninterruptible power supply is disposed within the second accommodation space.

In a possible embodiment, the power module further includes a cabinet, and a third accommodation space, a fourth accommodation space and a fifth accommodation space are provided within the cabinet. The input busbar and the output busbar are disposed within the third accommodation space, the internal protection unit is disposed within the fourth accommodation space, and the uninterruptible power supply is disposed within the fifth accommodation space.

In a possible embodiment, the third accommodation space is provided on the top of the cabinet, the fourth accommodation space is provided in a direction close to a side plate of the cabinet, and the fifth accommodation space is provided in a direction far away from the side plate.

In a possible embodiment, the uninterruptible power supply includes a body. The AC input terminal, the AC output terminal and the DC input terminal are disposed side by side on a first side of the body.

In a possible embodiment, the first side is a side close to the internal protection unit.

In a possible embodiment, in a case that the battery input terminal is electrically connected to the DC input terminal of the uninterruptible power supply through the internal protection unit, the internal protection unit includes a first AC input protection unit, a first AC output protection unit and a DC input protection unit. The input busbar is electrically connected to the AC input terminal through the first AC input protection unit, the output busbar is electrically connected to the AC output terminal through the first AC output protection unit, and the battery input terminal is electrically connected to the DC input terminal through the DC input protection unit.

In a possible embodiment, in a case that the battery input terminal is electrically connected to the DC input terminal and the external protection unit disposed outside the power module, the internal protection unit includes a second AC input protection unit and a second AC output protection unit. The input busbar is electrically connected to the AC input terminal through the second AC input protection unit, and the output busbar is electrically connected to the AC output terminal through the second AC output protection unit.

In the second aspect, a power distribution system is further provided in an embodiment of the present disclosure. The power distribution system includes the power module according to embodiments of the first aspect.

In a possible embodiment, the power distribution system further includes an external protection unit. The external protection unit is electrically connected to the battery input terminal in the power module and the DC input terminal of the uninterruptible power supply in the power module.

Beneficial effects of the present disclosure are described below.

The power module and the power distribution system are provided in the embodiment of the present disclosure. The power module includes the input busbar, the output busbar, the internal protection unit and the UPS. The input busbar is electrically connected to the AC input terminal of the UPS through the internal protection unit. The output busbar is electrically connected to the AC output terminal of the UPS through the internal protection unit. The battery input terminal is electrically connected to the DC input terminal of the UPS through the internal protection unit, or is electrically connected to the DC input terminal of the UPS and an external protection unit disposed outside the power module. In addition, the UPS is disposed independently from the input busbar and the output busbar. That is, the input busbar and the output busbar are disposed outside the UPS without passing through the inside of the UPS. Further, the AC input terminal, the AC output terminal and the DC input terminal of the UPS are all electrically connected to protection units. Therefore, after cutting off each protection unit, the UPS can be isolated from the live parts, so that the UPS can be removed while the power module is live. Therefore, the maintainability of the power module may be improved.

BRIEF DESCRIPTION OF THE DRAWINGS

For clearer illustration of the technical solutions according to embodiments of the present disclosure, drawings required in descriptions of the embodiments are briefly described below. Apparently, the drawings in the following descriptions only illustrate some of embodiments of the present disclosure, and other drawings can be obtained by those skilled in the art based on the provided drawings without creative efforts.

DETAILED DESCRIPTION

In order to make the objects, technical solutions and advantages of the present disclosure clearer, the disclosure is described in further detail below in conjunction with the accompanying drawings. Apparently, the described embodiments are only some of, rather than all, the embodiments of the present disclosure. Any other embodiments obtained by those skilled in the art based on the embodiments in the present disclosure without creative efforts shall fall within the protection scope of the present disclosure.

A power module is an important part of a power distribution system. There are two structures of the power module in the conventional technology, which are described in detail below.

Figure 1:
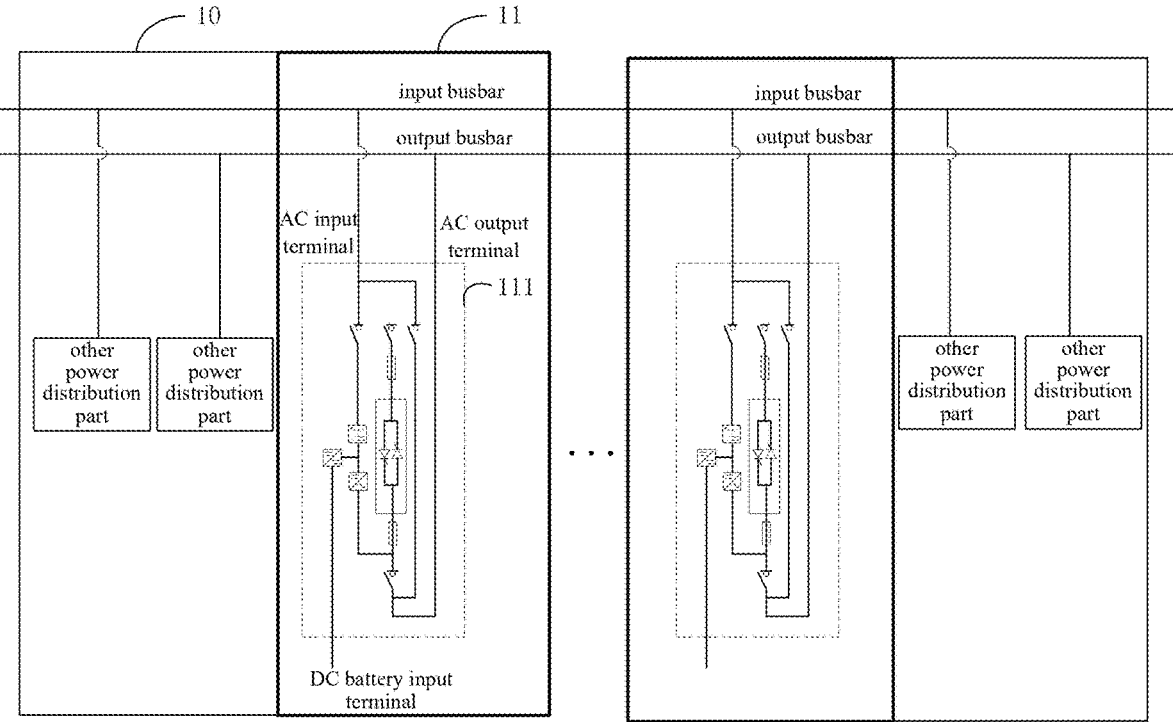
FIG. 1 is a schematic structural diagram of a power distribution system according to the conventional technology.

As shown in FIG. 1 which is a schematic structural diagram of a power module according to the conventional technology, a power module 10 includes a UPS 111 and a busbar (including an input busbar and an output busbar). The UPS 111 and the busbar are provided as an entirety 11. The UPS111 is electrically connected to the input busbar and the output busbar by using a cable and a copper bar, respectively. An AC input terminal and an AC output terminal of the UPS 111 are both disposed at the top of the UPS 111. A DC input terminal of the UPS 111 is disposed at the bottom of the UPS.

In the power module 10, the UPS 111 and the busbar are provided as an entirety. Therefore, the UPS 111 cannot be removed and replaced from the power module 10 while the power module 10 is live. The UPS 111 can be removed only when the power module 10 is powered off, which results in poor maintainability.

In addition, the UPS 111 in the power module 10 has a protection capability. A protection device is inside the UPS 111, and therefore cannot be large-sized. A connection port between a battery pack and the UPS 111 in the power module 10, that is, the DC input terminal of the UPS, is disposed at the bottom of the UPS. The cable or copper bar connecting the power module 10 and the battery pack need to be routed from the bottom of the power module 10, resulting in poor flexibility.

Figure 2:
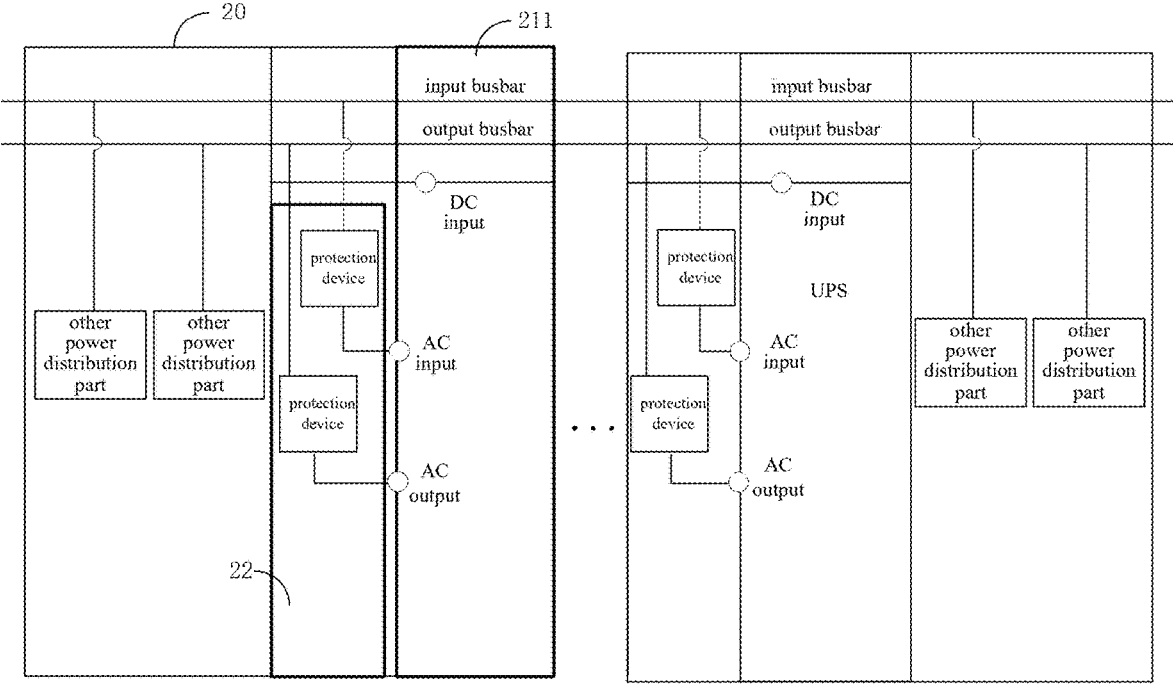
FIG. 2 is a schematic structural diagram of a power distribution system according to the conventional technology.

As shown in FIG. 2 which is a schematic structural diagram of another power module according to the conventional technology, a power module 20 includes a UPS 211, a protection unit 22 and a busbar. The UPS 211 and the busbar are provided as an entirety. The protection unit 22 is disposed on a side of the entirety composed of the UPS 211 and the busbar. In addition to being integrated with the UPS 211, the busbar is electrically connected to an AC input terminal and an AC output terminal of the UPS 211 through the protection unit 22. The AC input terminal and the AC output terminal of the UPS 211 are disposed on a side of the UPS 211, and a DC input terminal of the UPS 211 is disposed within the USP 211 near an upper end of UPS211.

In the power module 20, the UPS 211 and the busbar are provided as an entirety. Therefore, the UPS 211 cannot be removed and replaced from the power module 20 while the power module 20 is live. The UPS 211 can be removed only when the power module 20 is powered off, which results in poor maintainability.

In addition, since the DC input terminal of the UPS 211 is disposed within the USP 211 near the upper end of UPS 211, a cable or copper bar connecting the power module 20 and a battery pack need to be routed from the top of the power module 20, resulting in poor flexibility.

In view of the above technical problems, a power module is provided in an embodiment of the present disclosure. The power module includes an input busbar, an output busbar, an internal protection unit, a UPS and a battery input terminal.

The input busbar is electrically connected to an AC input terminal of the UPS through the internal protection unit.

The output busbar is electrically connected to an AC output terminal of the UPS through the internal protection unit.

The battery input terminal is electrically connected to a DC input terminal of the UPS through the internal protection unit, or the battery input terminal is electrically connected to the DC input terminal and an external protection unit disposed outside the power module.

The UPS is disposed independently from the input busbar and the output busbar.

In the embodiment of the present disclosure, the input busbar is electrically connected to the AC input terminal of the UPS through the internal protection unit; the output busbar is electrically connected to the AC output terminal of the UPS through the internal protection unit; and the battery input terminal is electrically connected to the DC input terminal of the UPS through the internal protection unit, or is electrically connected to the DC input terminal of the UPS and the external protection unit outside the power module. In addition, the UPS is disposed independently from the input busbar and the output busbar, that is, the input busbar and the output busbar are disposed outside the UPS without passing through the inside of the UPS. Further, the AC input terminal, the AC output terminal and the DC input terminal of the UPS are all electrically connected to protection units. Therefore, after cutting off each protection unit, the UPS can be isolated from the live parts, so that the UPS can be removed while the power module is live. Hence, the maintainability of the power module can be improved.

In the power module according to an embodiment of the present disclosure, the battery input terminal may be electrically connected to the DC input terminal of the UPS through the internal protection unit of the power module, or the battery input terminal may be electrically connected to the DC input terminal and an external protection unit disposed outside the power module. These two structures are described below.

Figure 3:
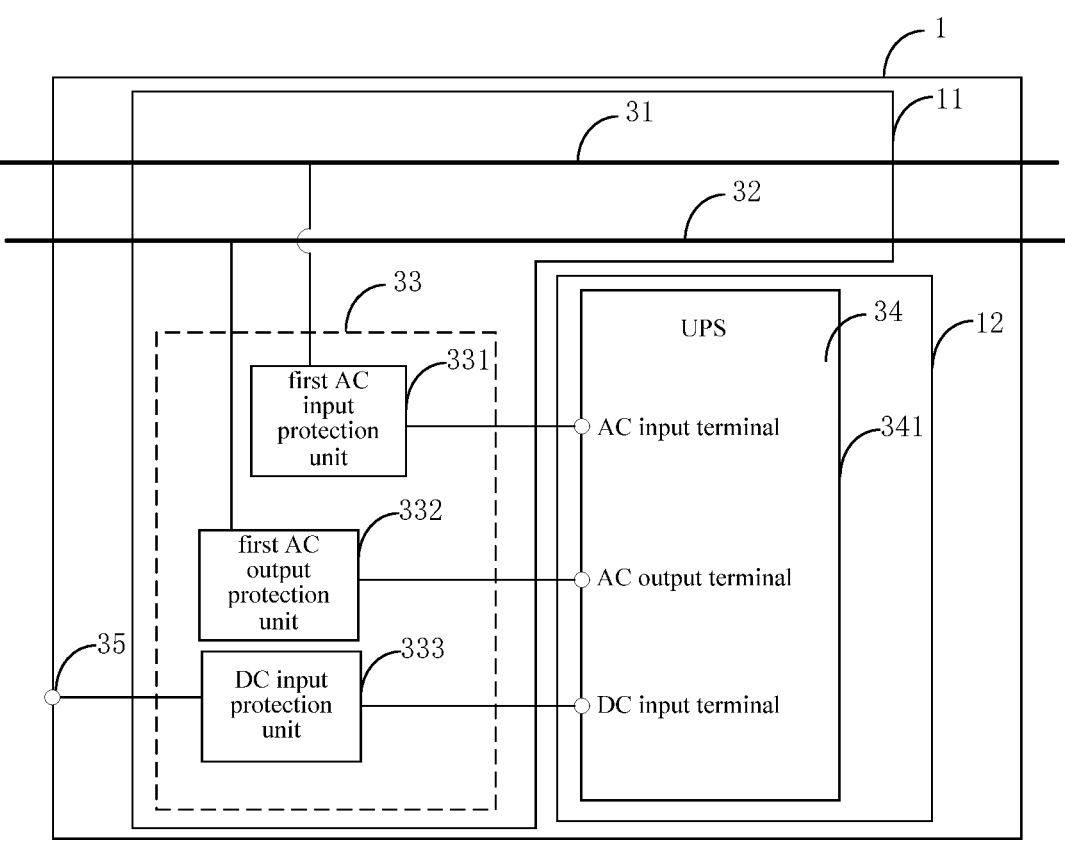
FIG. 3 is a schematic structural diagram of a power module according to an embodiment of the present disclosure.

FIG. 3 is a schematic structural diagram of a power module according to an embodiment of the present disclosure. As can be seen from FIG. 3, the power module includes an input busbar 31, an output busbar 32, an internal protection unit 33, a UPS 34 and a battery input terminal 35.

The input busbar 31 is electrically connected to an AC input terminal of the UPS 34 through the internal protection unit 33.

The output busbar 32 is electrically connected to an AC output terminal of the UPS 34 through the internal protection unit 33.

The battery input terminal 35 is electrically connected to a DC input terminal of the UPS 34 through the internal protection unit 33.

The UPS 34 is disposed independently from the input busbar 31 and the output busbar 32.

In an embodiment of the present disclosure, the protection unit corresponding to the DC input terminal of the UPS 34 is disposed inside the power module. Therefore, the battery input terminal 35 is electrically connected to the battery pack directly.

As can be seen from FIG. 3, in the power module according to the embodiment of the present disclosure, the internal protection unit 33 includes a first AC input protection unit 331, a first AC output protection unit 332 and a DC input protection unit 333.

The input busbar 31 is electrically connected to the AC input terminal of the UPS 34 through the first AC input protection unit 331. The output busbar 32 is electrically connected to the AC output terminal of the UPS 34 through the first AC output protection unit 332. The battery input terminal 35 is electrically connected to the DC input terminal of UPS 34 through the DC input protection unit 333.

In an embodiment of the present disclosure, the DC input protection unit 333 corresponding to the DC input terminal of the UPS 34 is disposed inside the power module, which facilitates installation. In addition, in an embodiment of the present disclosure, the internal protection unit 33 is disposed outside the UPS 34. Therefore, a protection device in the internal protection unit 33 is not limited by size, and may be a small-sized protection device such as an isolation switch (SWITCH), a molded case circuit breaker (MCCB) or a fuse, or may be a large-sized protection device such as an air circuit breaker (ACB).

Figure 4:
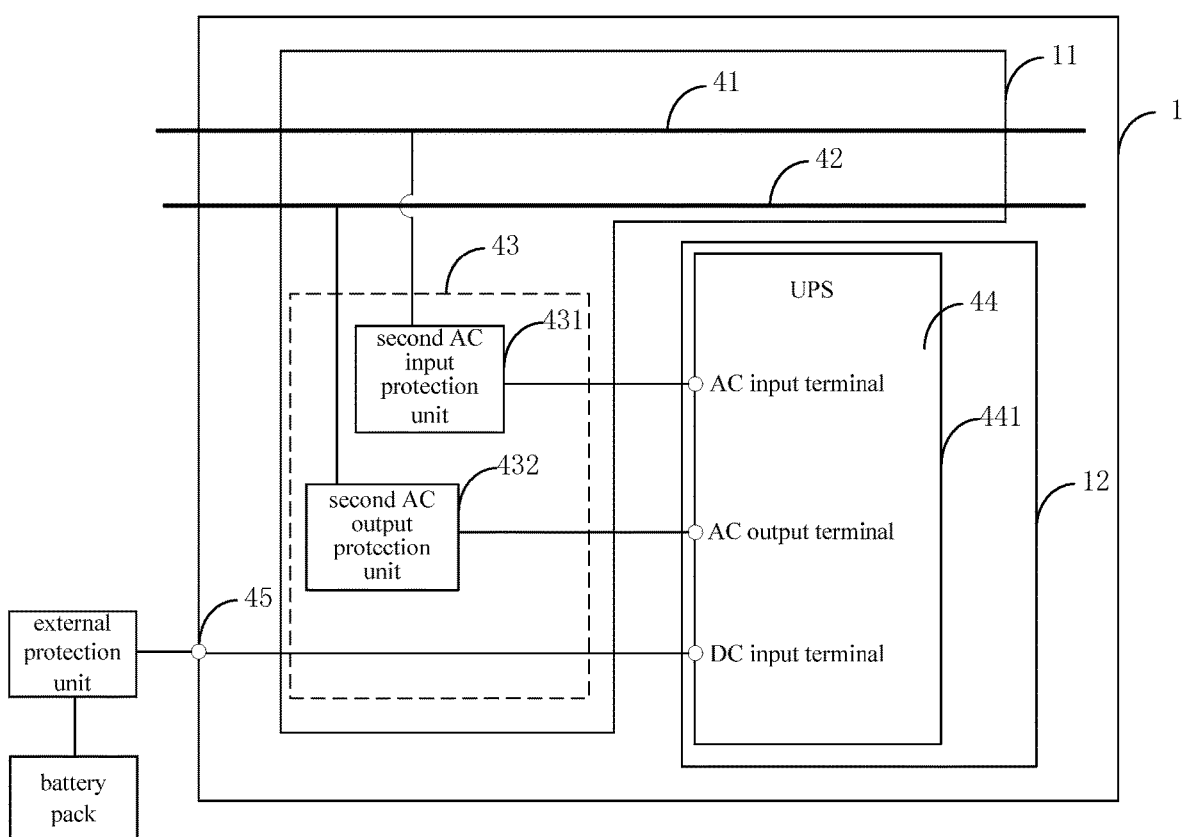
FIG. 4 is a schematic structural diagram of a power module according to another embodiment of the present disclosure.

FIG. 4 is a schematic structural diagram of a power module according to another embodiment of the present disclosure. As can be seen from FIG. 4, the power module includes an input busbar 41, an output busbar 42, an internal protection unit 43, a UPS 44 and a battery input terminal 45.

The input busbar 41 is electrically connected to an AC input terminal of the UPS 44 through the internal protection unit 43.

The output busbar 42 is electrically connected to an AC output terminal of the UPS 44 through the internal protection unit 43.

The battery input terminal 45 is electrically connected to a DC input terminal of the UPS 44 and an external protection unit disposed outside the power module.

The UPS 44 is disposed independently from the input busbar 41 and the output busbar 42.

In an embodiment of the present disclosure, the protection unit corresponding to the DC input terminal of the UPS 44 is disposed outside the power module. Therefore, the battery input terminal 45 of the power module is electrically connected to the external protection unit, and another terminal of the external protection unit is electrically connected to a battery pack. That is, the battery input terminal 45 is electrically connected to the battery pack through the external protection unit.

As can be seen from FIG. 4, in the power module according to the embodiment of the present disclosure, the internal protection unit 43 includes a second AC input protection unit 431 and a second AC output protection unit 432.

The input busbar 41 is electrically connected to the AC input terminal of the UPS 44 through the second AC input protection unit 431. The output busbar 42 is electrically connected to the AC output terminal of the UPS 44 through the second AC output protection unit 432.

In an embodiment of the present disclosure, the protection unit corresponding to the DC input terminal of the UPS 44 is disposed outside the power module, which may reduce the size of the power module. In addition, in an embodiment of the present disclosure, the internal protection unit 43 is disposed outside the UPS 44. Therefore, a protection device in the internal protection unit 43 is not limited by size, and may be a small-sized protection device such as an isolation switch (SWITCH), a molded case circuit breaker (MCCB) or a fuse, or may be a large-sized protection device such as an air circuit breaker (ACB).

In an embodiment, the uninterruptible power supply includes a body.

The AC input terminal, the AC output terminal and the DC input terminal are disposed side by side on a first side of the body.

As shown in FIG. 3, the UPS 34 includes a body 341. As shown in FIG. 4, the UPS 44 includes a body 441. The AC input terminal, the AC output terminal and the DC input terminal are disposed side by side on the same side of the body. Compared with the case where the terminals are disposed on the top or the bottom, wirings may be routed from the top of the body of the UPS or from the bottom of the body of the UPS, which results in a more flexible wiring.

In a specific implementation, a first side of the body of the UPS may be a side close to the internal protection unit. For example, the internal protection unit is disposed on the left of the UPS, and the first side of the UPS is the side on the left of the UPS. For another example, the internal protection unit is disposed on the right of the UPS, and the first side of the UPS is the side on the right of the UPS.

In an embodiment, as shown in FIG. 3 and FIG. 4, the power module further includes a cabinet 1. A first accommodation space 11 and a second accommodation space 12 are provided within the cabinet 1.

The input busbar, the output busbar and the internal protection unit are disposed within the first accommodation space 11.

The UPS is disposed within the second accommodation space 12.

In an embodiment of the present disclosure, devices disposed in the same accommodation space are formed as an entirety and can be removed and replaced separately. That is, the input busbar, output busbar and the internal protection unit are formed as an entirety, and the UPS is provided as an entirety.

Figure 5:
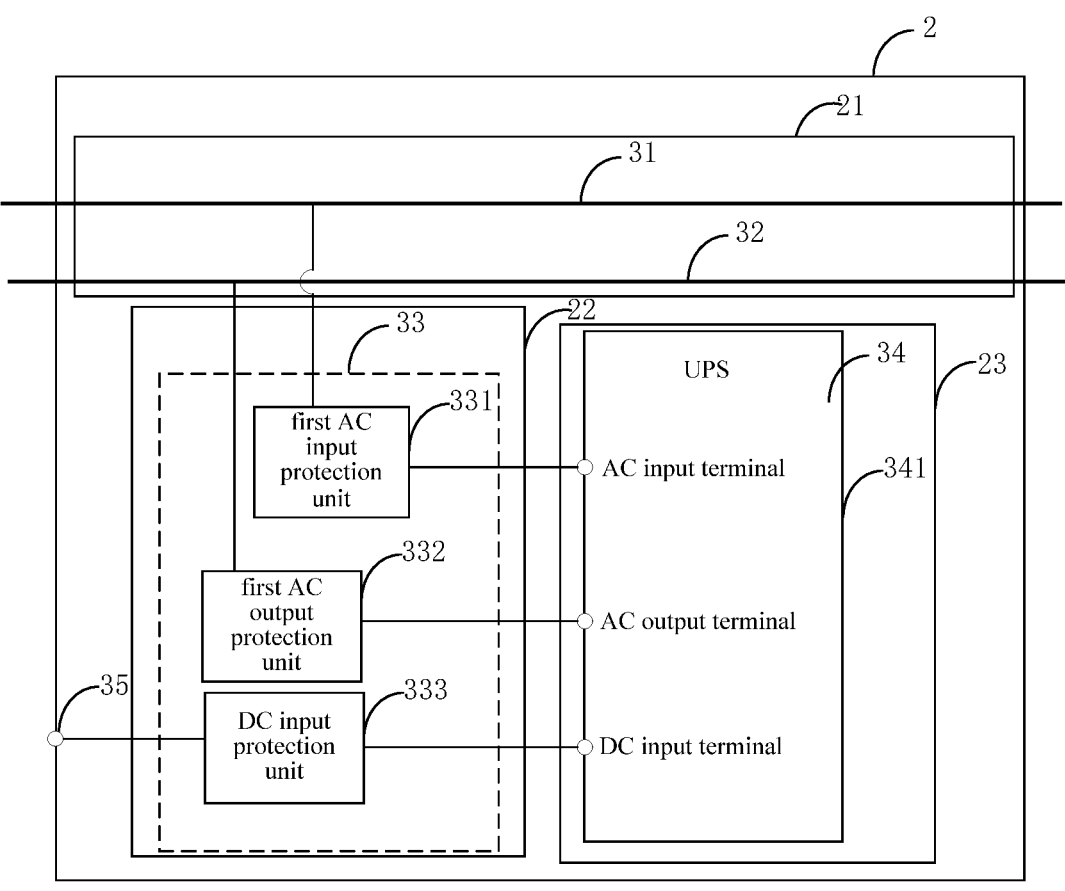
FIG. 5 is a schematic structural diagram of a power module according to another embodiment of the present disclosure.
Figure 6:
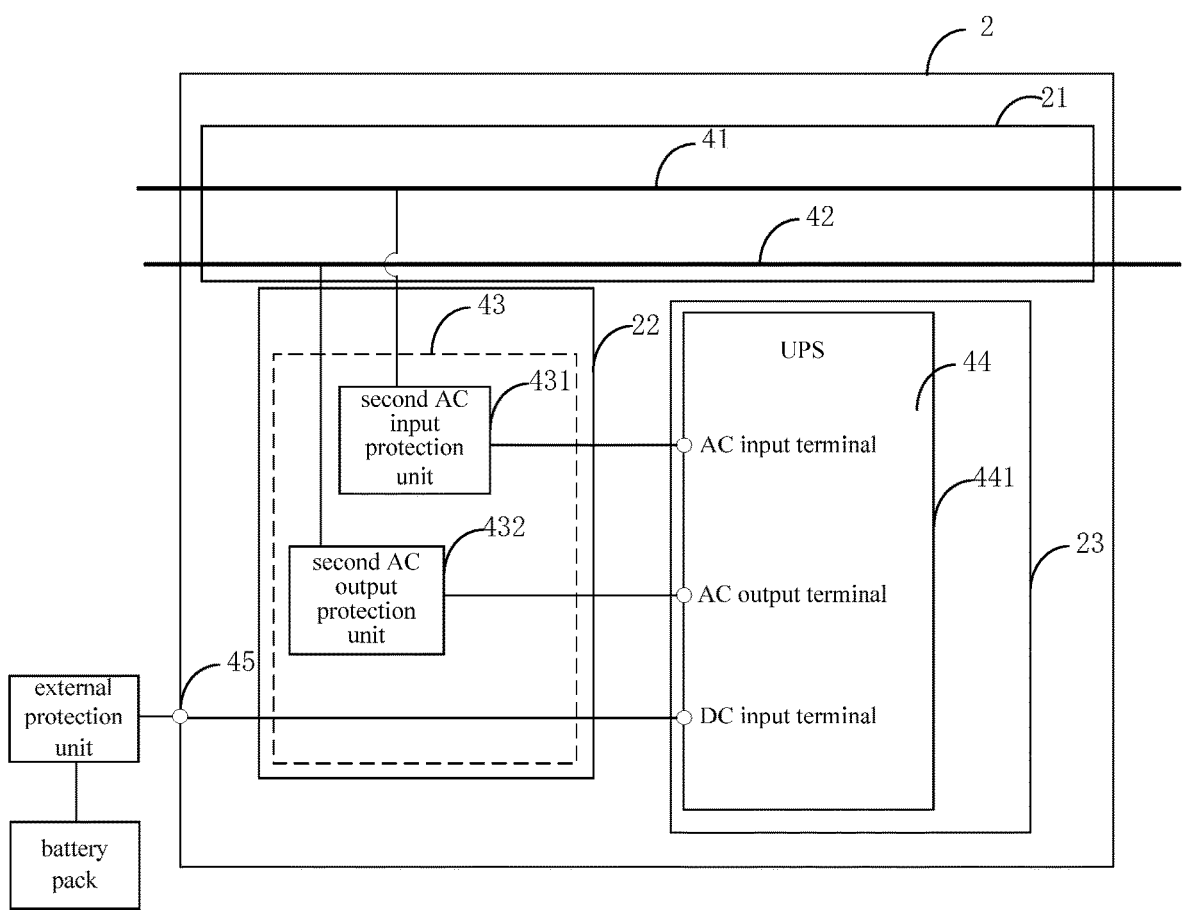
FIG. 6 is a schematic structural diagram of a power module according to another embodiment of the present disclosure.

In another embodiment, as shown in FIG. 5 and FIG. 6, the power module further includes a cabinet 2. A third accommodation space 21, a fourth accommodation 22 and a fifth accommodation space 23 are provided within the cabinet 2.

The input busbar and the output busbar are disposed within the third accommodation space 21.

The internal protection unit is disposed within the fourth accommodation space 22.

The UPS is disposed within the fifth accommodation space 23.

In a specific implementation, the third accommodation space 21 is disposed on the top of the cabinet 2, the fourth accommodation space 22 is disposed in a direction close to a side plate of the cabinet 2, and the fifth accommodation space 23 is disposed in a direction far away from the side plate.

In an embodiment of the present disclosure, the input busbar and the output busbar are set as an entirety, the internal protection unit is set as an entirety, and the UPS is set as an entirety, so as to facilitate disassembly and replacement.

Based on the same concept, a power distribution system is further provided in an embodiment of the present disclosure. The power distribution system includes the power module according to any one of the above embodiments.

Figure 7:
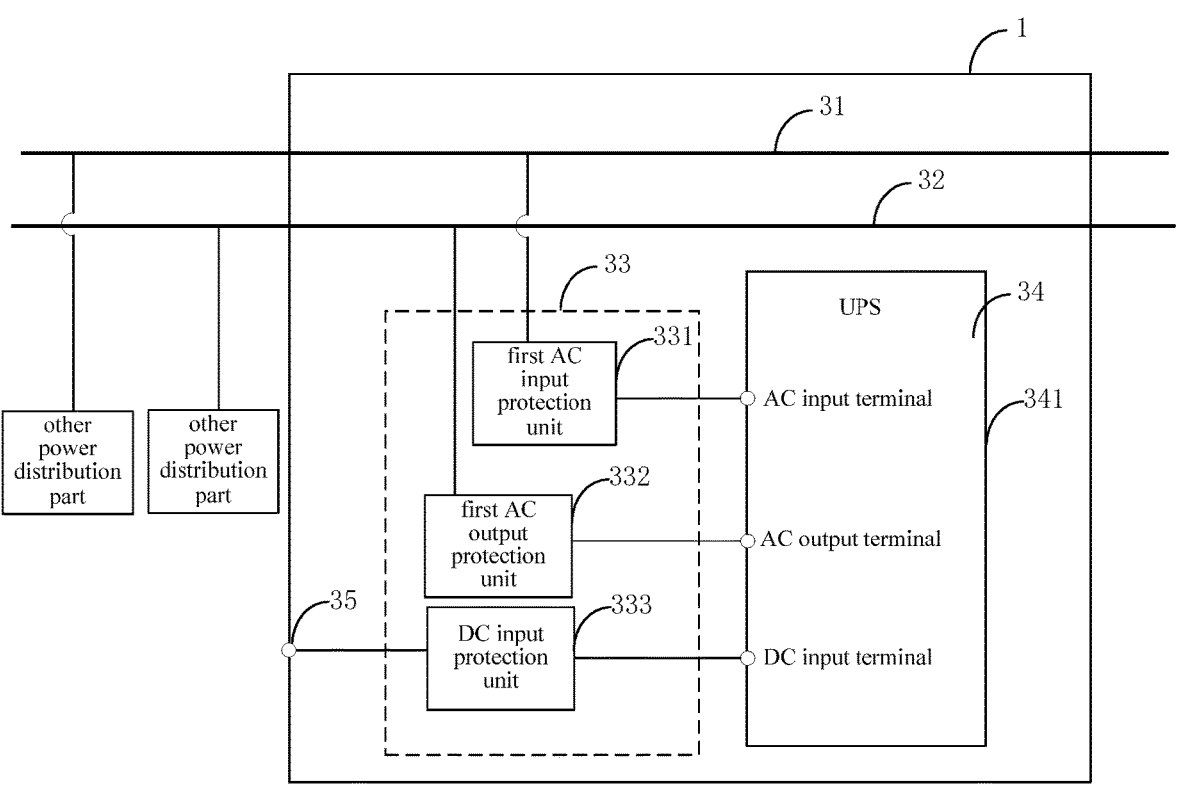
FIG. 7 is a schematic structural diagram of a power distribution system according to an embodiment of the present disclosure.
Figure 8:
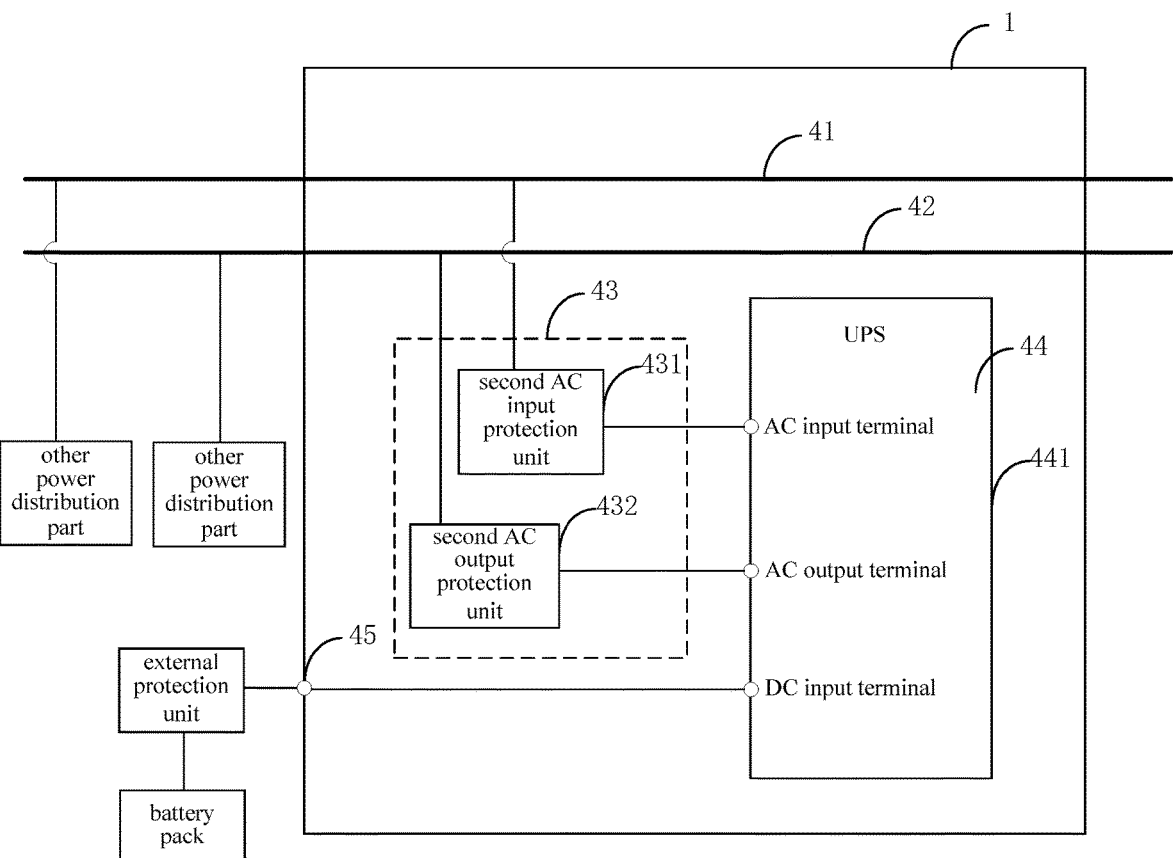
FIG. 8 is a schematic structural diagram of a power distribution system according to another embodiment of the present disclosure.

As shown in FIG. 7 and FIG. 8, the power distribution system according to an embodiment of the present disclosure may further include another power distribution unit.

In a specific implementation, in the case that the internal protection unit includes a second AC input protection unit 431 and a second AC output protection unit 432, the power distribution system further includes an external protection unit. As shown in FIG. 8, the external protection unit is electrically connected to the battery input terminal in the power module and the DC input terminal of the UPS in the power module.

It should be noted that the power distribution system provided in the embodiment of the present disclosure may include multiple power modules and multiple other power distribution units, and the number of the power modules and the other power distribution units is not limited.

The power module and the power distribution system are provided in the embodiment of the present disclosure. The power module includes the input busbar, the output busbar, the internal protection unit and the UPS. The input busbar is electrically connected to the AC input terminal of the UPS through the internal protection unit. The output busbar is electrically connected to the AC output terminal of the UPS through the internal protection unit. The battery input terminal is electrically connected to the DC input terminal of the UPS through the internal protection unit, or is electrically connected to the DC input terminal of the UPS and an external protection unit disposed outside the power module. In addition, the UPS is disposed independently from the input busbar and the output busbar. That is, the input busbar and the output busbar are disposed outside the UPS without passing through the inside of the UPS. Further, the AC input terminal, the AC output terminal and the DC input terminal of the UPS are all electrically connected to protection units. Therefore, after cutting off each protection unit, the UPS can be isolated from the live part, so that the UPS can be removed while the power module is live. Therefore, the maintainability of the power module can be improved.

Various modifications and variations to the present disclosure can be made by those skilled in the art without departing from the spirit and scope of the present disclosure. Therefore, as such modifications and variations of the present disclosure fall within the scope of the claims of the present disclosure and equivalent technologies, the present disclosure is intended to include such modifications and variations.

The invention claimed is:

1. A power module, comprising: an input busbar, an output busbar, an internal protection unit, an uninterruptible power supply, a battery input terminal, and a cabinet having a third accommodation space, a fourth accommodation space and a fifth accommodation space, wherein:

the input busbar and the output busbar are set as an entirety within the third accommodation space, the internal protection unit is set as an entirety within the fourth accommodation space, the input busbar is electrically connected to an alternating current (AC) input terminal of the uninterruptible power supply through the internal protection unit, and the output busbar is electrically connected to an AC output terminal of the uninterruptible power supply through the internal protection unit;

the battery input terminal is electrically connected to a direct current (DC) input terminal of the uninterruptible power supply and an external protection unit disposed outside the power module; and the uninterruptible power supply is set as an entirety within the fifth accommodation space and disposed independently from the input busbar and the output busbar.

2. The power module according to claim 1, wherein the third accommodation space is provided on the top of the cabinet, the fourth accommodation space is provided in a direction close to a side plate of the cabinet, and the fifth accommodation space is provided in a direction far away from the side plate.

3. The power module according to claim 1, wherein
the uninterruptible power supply comprises a body; and
the AC input terminal, the AC output terminal and the DC input terminal are disposed side by side on a first side of the body.

4. The power module according to claim 3, wherein the first side is a side close to the internal protection unit.

5. The power module of claim 1, wherein the internal protection unit comprises a second AC input protection unit and a second AC output protection unit; and
the input busbar is electrically connected to the AC input terminal through the second AC input protection unit, and the output busbar is electrically connected to the AC output terminal through the second AC output protection unit.

6. A power distribution system, comprising the power module according to claim 1.

7. The power distribution system according to claim 6, further comprising an external protection unit,
wherein the external protection unit is electrically connected to the battery input terminal in the power module and the DC input terminal of the uninterruptible power supply in the power module.

* * * * *